(12) United States Patent
Davis et al.

(10) Patent No.: US 12,014,712 B2
(45) Date of Patent: Jun. 18, 2024

(54) CORRUGATED ACOUSTIC STIFFENING DEVICES AND METHODS

(71) Applicant: ROHR, INC., Chula Vista, CA (US)

(72) Inventors: Jennifer Davis, La Jolla, CA (US); Nathaniel M. Gray, Stratham, NH (US)

(73) Assignee: ROHR, INC., Chula Vista, CA (US)

(*) Notice: Subject to any disclaimer, the term of this patent is extended or adjusted under 35 U.S.C. 154(b) by 228 days.

(21) Appl. No.: 17/465,051

(22) Filed: Sep. 2, 2021

(65) Prior Publication Data

US 2023/0064499 A1    Mar. 2, 2023

(51) Int. Cl.
| | | |
|---|---|---|
| *G10K 11/00* | (2006.01) | |
| *B29C 70/42* | (2006.01) | |
| *B29K 101/12* | (2006.01) | |
| *B29L 7/00* | (2006.01) | |
| *B32B 3/26* | (2006.01) | |

(Continued)

(52) U.S. Cl.
CPC ............ *G10K 11/002* (2013.01); *B29C 70/42* (2013.01); *B32B 3/266* (2013.01); *B32B 3/28* (2013.01); *B32B 27/20* (2013.01); *B64D 29/08* (2013.01); *B29K 2101/12* (2013.01); *B29L 2007/002* (2013.01); *B32B 2307/102* (2013.01); *B32B 2605/18* (2013.01)

(58) Field of Classification Search
CPC ....... G10K 11/002; B29C 70/42; B32B 3/266; B32B 3/28; B32B 27/20; B32B 2307/102; B32B 2605/18; B64D 29/08; B29K 2101/12; B29L 2007/002
See application file for complete search history.

(56) References Cited

U.S. PATENT DOCUMENTS 3,507,355 A * 4/1970 Lawson .................. F02K 1/827
                                                    181/292
3,658,612 A     4/1972 Corzine
(Continued)

FOREIGN PATENT DOCUMENTS

DE    102011076082    11/2012
EP    2833356         2/2015
(Continued)

OTHER PUBLICATIONS

USPTO; Non-Final Office action dated Feb. 7, 2023 in U.S. Appl. No. 17/465,027.

(Continued)

*Primary Examiner* — Forrest M Phillips
(74) *Attorney, Agent, or Firm* — SNELL & WILMER L.L.P.

(57) ABSTRACT

A method for forming a fiber-reinforced thermoplastic acoustic panel may comprise: stacking plies of thermoplastic composite sheets to a first thickness to form a top sheet; stacking plies of thermoplastic composite sheets to a second thickness to form a backskin; staking plies of thermoplastic composite sheets to a third thickness to form a stiffening member; forming the top sheet in a first contour; forming the backskin in a second contour, the second contour being different from the first contour; forming the stiffening member comprising a shape having a plurality of peaks and troughs; bonding the stiffening member to the top sheet and the backskin; and perforating the top sheet.

20 Claims, 7 Drawing Sheets

(51) Int. Cl.
*B32B 3/28* (2006.01)
*B32B 27/20* (2006.01)
*B64D 29/08* (2006.01)

(56) References Cited

U.S. PATENT DOCUMENTS

| | | | |
|---|---|---|---|
| 5,399,215 | A | 3/1995 | Blot et al. |
| 5,462,408 | A | 10/1995 | Coffy |
| 6,632,502 | B1 | 10/2003 | Allen et al. |
| 6,713,008 | B1 | 3/2004 | Teeter |
| 8,245,971 | B2 | 8/2012 | Makela et al. |
| 8,292,227 | B2 | 10/2012 | Stuhr et al. |
| 8,377,247 | B2 | 2/2013 | Guzman et al. |
| 9,023,265 | B1 * | 5/2015 | Rotter .................... B29C 70/30 264/258 |
| 9,358,764 | B2 | 6/2016 | Prebil et al. |
| 9,610,756 | B2 | 4/2017 | Ashton et al. |
| 9,761,216 | B2 * | 9/2017 | Nampy ................. G10K 11/175 |
| 9,764,818 | B2 | 9/2017 | Nampy et al. |
| 9,783,289 | B2 | 10/2017 | Lee et al. |
| 10,232,926 | B2 | 3/2019 | Goehlich |
| 10,556,670 | B2 | 2/2020 | Koppelman et al. |
| 10,695,986 | B2 * | 6/2020 | Gurney .................. B32B 27/08 |
| 10,933,595 | B2 | 3/2021 | Matsumoto et al. |
| 11,242,822 | B2 * | 2/2022 | Gurvich .................... F02C 7/24 |
| 11,572,850 | B2 * | 2/2023 | Kelford .................. B64D 29/00 |
| 11,703,031 | B2 * | 7/2023 | Adrian Schmidt ..... F03D 80/50 416/1 |
| 11,732,674 | B2 * | 8/2023 | Glemarec ................. F02K 1/72 60/226.2 |
| 2003/0089824 | A1 | 5/2003 | Stemberger |
| 2006/0141260 | A1 * | 6/2006 | Haque ....................... B32B 5/02 428/537.1 |
| 2010/0163167 | A1 * | 7/2010 | Maheshwari ......... B29C 70/545 156/245 |
| 2011/0135862 | A1 | 6/2011 | Sumi |
| 2013/0266772 | A1 * | 10/2013 | Fujii ......................... B32B 3/28 156/60 |
| 2013/0302544 | A1 | 11/2013 | Benthien et al. |
| 2013/0316147 | A1 | 11/2013 | Douglas et al. |
| 2014/0099477 | A1 | 4/2014 | Matsen et al. |
| 2014/0186586 | A1 | 7/2014 | Victorazzo |
| 2016/0257396 | A1 | 9/2016 | Cawthorne et al. |
| 2017/0355152 | A1 | 12/2017 | Joern |
| 2018/0229829 | A1 | 8/2018 | Pierick et al. |
| 2019/0153993 | A1 | 5/2019 | Tobin et al. |
| 2019/0283856 | A1 | 9/2019 | Clapp et al. |
| 2020/0010175 | A1 | 1/2020 | Sanz Martinez et al. |
| 2020/0307756 | A1 | 10/2020 | Periyasamy et al. |
| 2020/0095955 | A1 | 11/2020 | Davis |
| 2020/0353667 | A1 | 11/2020 | Davis |
| 2021/0039349 | A1 | 2/2021 | Gurvich et al. |

FOREIGN PATENT DOCUMENTS

| | | |
|---|---|---|
| EP | 3643471 | 4/2020 |
| EP | 3858584 | 8/2021 |
| FR | 2559422 | 2/1985 |

OTHER PUBLICATIONS

Chen, L. et al., Compressive response of multi-layered thermoplastic composite corrugated sandwhich panels: Modelling and experiments, Composite Part B 189 (2020), 8 Pages, (Year: 2020).

European Patent Office, European Search Report dated Jan. 20, 2023 in Application No. 22193485.4.

European Patent Office, European Search Report dated Jan. 30, 2023 in Application No. 22193787.3.

European Patent Office, European Search Report dated Jan. 26, 2023 in Application No. 22193452.4.

USPTO; Final Office Action dated Jan. 18, 2023 in U.S. Appl. No. 17/464,997.

USPTO; Advisory Action dated Mar. 30, 2023 in U.S. Appl. No. 17/464,997.

USPTO; Final Office Action dated Jun. 5, 2023 in U.S. Appl. No. 17/465,027.

USPTO; Advisory Action dated Aug. 8, 2023 in U.S. Appl. No. 17/465,027.

USPTO; Notice of Allowance dated May 10, 2023 in U.S. Appl. No. 17/464,997.

USPTO; Restriction/Election Requirement dated Jun. 14, 2022 in U.S. Appl. No. 17/465,027.

USPTO; Restriction/Election Requirement dated Aug. 24, 2022 in U.S. Appl. No. 17/464,997.

Hu, J. et al., Novel panel-core connection process and impact behaviors of CF/PEEK thermoplastic composite sandwich structures with truss cores, Composite Structures, vol. 251 (2020), 16 pages. (Year: 2020).

USPTO; Non-Final Office Action dated Sep. 21, 2022 in U.S. Appl. No. 17/464,997.

USPTO; Notice of Allowance dated Feb. 2, 2024 in U.S. Appl. No. 17/465,027.

USPTO; Non-Final Office action dated Sep. 19, 2023 in U.S. Appl. No. 17/465,027.

* cited by examiner

CORRUGATED ACOUSTIC STIFFENING DEVICES AND METHODS

FIELD

The present disclosure relates to turbine engine systems and, more specifically, to acoustic panels in gas turbine engines.

BACKGROUND

Acoustic panel construction is commonly used on aircraft components to provide structural elements where noise attenuation is also desired. Acoustic panels commonly comprise a non-perforated backskin, a honeycomb or other shape core, and a perforated top sheet. The core forms one or more resonator chambers which are open through the perforations in the top sheet. The acoustic panels may be utilized in various locations in a nacelle for a gas turbine engine, such as in the inner barrel, the inner fixed structure, or on blocker doors.

SUMMARY

A method for forming a fiber-reinforced thermoplastic acoustic panel is disclosed herein. The method may comprise: forming a plurality of plies of thermoplastic composite sheets to a first thickness to form a top sheet; perforating the top sheet; forming a plurality of plies of thermoplastic composite sheets to a second thickness to form a backskin; forming a plurality of plies of thermoplastic composite sheets to a third thickness to form a stiffening member; forming the top sheet in a first contour; forming the backskin in a second contour, the second contour being different from the first contour; forming the stiffening member comprising a shape having a plurality of peaks and troughs; and joining the stiffening member to the top sheet and the backskin.

In various embodiments, forming the top sheet, forming the backskin, and forming the stiffening member are each performed via stamp forming. Forming the top sheet, forming the backskin, and forming the stiffening member may each be performed via twin sheet forming. Forming the top sheet, forming the backskin, and forming the stiffening member may each performed via automated fiber placement. The plurality of peaks may be joined to and mate with the top sheet, and the troughs may be joined to and mate with the backskin. Joining the stiffening member to the top sheet and the backskin may form the fiber-reinforced thermoplastic acoustic panel. The stiffening member may be disposed between the backskin and the top sheet.

An acoustic panel for a nacelle is disclosed herein. The acoustic panel may comprise: a non-perforated backskin; a perforated top sheet; and a core located between the non-perforated backskin and the perforated top sheet, the core including a corrugated stiffener.

In various embodiments, the corrugated stiffener includes alternating peaks and troughs. The peaks may mate with and be coupled to the perforated top sheet, and the troughs may mate with and be coupled to the non-perforated backskin. The perforated top sheet may include a plurality of perforations. A set of the plurality of perforations may be in fluid communication with a hollow chamber at least partially defined by a portion of the corrugated stiffener extending from a first peak to a trough to a second peak. The plurality of peaks may be joined to and mate with the top sheet, and the troughs may be joined to and mate with the backskin. The nacelle may comprise the acoustic panel.

An example of an acoustic panel captured as a blocker door for a nacelle is disclosed herein. The blocker door may comprise a backskin; a top sheet; and a core located between the backskin and the top sheet, the core comprising a corrugated stiffener.

In various embodiments, the corrugated stiffener includes alternating peaks and troughs. The peaks may mate with and be coupled to the top sheet, and the troughs may mate with and be coupled to the backskin. The top sheet may include a plurality of perforations. A set of the plurality of perforations may be in fluid communication with a hollow chamber at least partially defined by a portion of the corrugated stiffener extending from a first peak to a trough to a second peak. The nacelle may comprise the blocker door.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
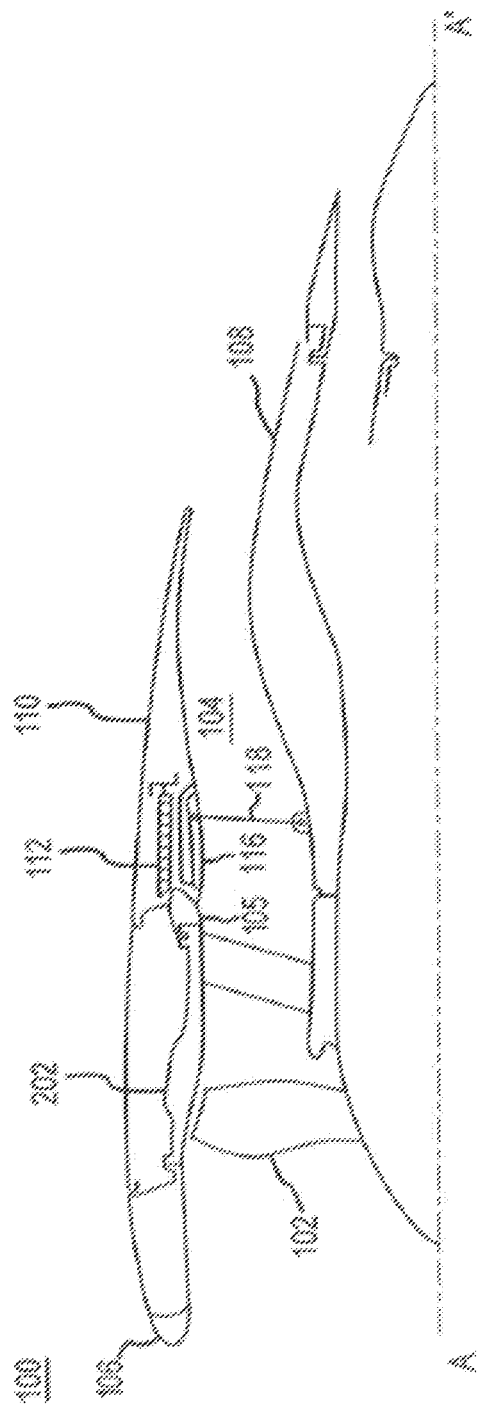
FIG. 1 illustrates a cross-section view of a nacelle in accordance with various embodiments.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

A nacelle for a gas turbine engine may comprise several acoustic structures including inner barrels, blocker doors, translating sleeves. Blocker doors may comprise an acoustic panel having a honeycomb core. In a blocker door application, acoustic area is lost on edge portions from a ramp down of the blocker door due to the manufacturing process of acoustic panels with the honeycomb core. Thus, disclosed herein are systems and methods for manufacturing an acoustic panel with a corrugated stiffening member for use in applications where an alternate stiffening structure can optimize an acoustic use case. Additionally, the corrugated stiffening member may be utilized throughout the acoustic panel for ease of manufacturing and produce similar acoustic efficiency, in accordance with various embodiments.

In the disclosure, the thermoplastic resin to be used for the acoustic panel may be either crystalline or amorphous.

Examples of the crystalline thermoplastic resin include polyester, polyolefin, polyoxymethylene (POM), polyamide (PA), polyarylene sulfide, polyketone (PK), polyetherketone (PEK), polyether ether ketone (PEEK), polyether ketone ketone (PEKK), polyvinylidene fluoride (PVDF), polytetrafluoroethylene (PTFE), polyaryletherketone (PAEK), polyether nitrile (PEN), fluororesin, and liquid crystal polymer (LCP). Examples of the polyester include polyethylene terephthalate (PET), polybutylene terephthalate (PBT), polytrimethylene terphthalate (PTT), polyethylene naphthalate (PEN), and liquid crystal polyester. Examples of the polyolefin include polyethylene (PE), polypropylene (PP), and polybutylene. Examples of the polyarylene sulfide include polyphenylene sulfide (PPS). Examples of the fluororesin include polytetrafluoroethylene.

Examples of the amorphous thermoplastic resin include polystyrene, polycarbonate (PC), polymethyl methacrylate (PMMA), polyvinyl chloride (PVC), polyphenylene ether (PPE), polyimide (PI), polyamide imide (PAI), polyetherimide (PEI), polysulfone (PSU), polyether sulfone (PES), and polyarylate (PAR). The thermoplastic resin to be used for the control surface also may be phenoxy resin, polystyrene, polyolefin, polyurethane, polyester, polyamide, polybutadiene, polyisoprene, fluorine resin, acrylonitrile, and other thermoplastic elastomers, and copolymers and modified resin thereof.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight or motion. For example, with reference to FIG. 1, point A is forward of point A' along axis A-A'.

Referring to FIG. 1, a partial cross-section of a jet aircraft propulsion system nacelle 100 is shown. The nacelle 100 may extend from forward to aft along the axis A-A'. In flight, air from point A may flow around and/or through the nacelle 100 generally in the direction from point A to point A'.

The nacelle 100 may generally function to package a gas turbine engine and a fan or turbofan 102 and may guide air around the external portion of the nacelle 100 and internally through the nacelle 100 to define the bypass air duct 104.

The nacelle 100 may include an inlet 106 through which air may enter the nacelle 100. Some portion of airflow may enter the gas turbine engine, and some portion of airflow may flow through the bypass air duct 104. An inner fixed structure ("IFS") 108 may define an inner airflow surface of the bypass air duct 104 and may be disposed coaxially about the gas turbine engine. The gas turbine engine may burn a hydrocarbon fuel in the presence of compressed air to generate exhaust gas. The exhaust gas may drive a turbine, which may, through a shaft, drive the fan 102 at the forward portion of the nacelle 100. The fan 102 may rotate to generate bypass fan airflow in a bypass air duct 104. The air flowing through the inlet 106 may flow in an axial direction. However, aft of the fan 102, the direction of airflow may vary in multiple directions.

The nacelle 100 may further comprise a thrust reversing assembly or a thrust reverser. The thrust reversing assembly may comprise a plurality of thrust reversing components, including, for example, a translating sleeve 110, a cascade 112, one or more blocker doors 116, and/or one or more drag links 118. The blocker door 116 may be coupled to the IFS 108 by the drag link 118.

Figure 2:
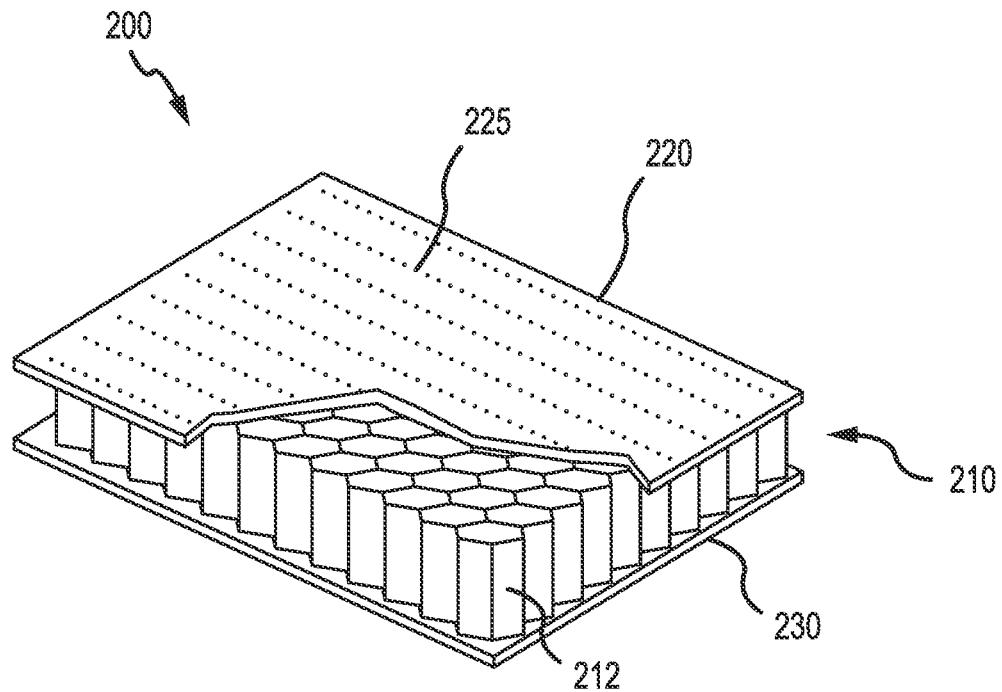
FIG. 2 illustrates a perspective view of a prior art acoustic panel in accordance with various embodiments.

Referring to FIG. 2, a prior art acoustic panel 200 is illustrated according to various embodiments. The acoustic panel 200 may be an acoustic panel in a nacelle for an aircraft engine. Various portions of the nacelle may comprise an acoustic panel, such as the blocker doors 116 from FIG. 1. The acoustic panel 200 may comprise a core 210, positioned between a perforated top sheet 220 and a backskin 230. The core 210 may comprise a plurality of cells 212. The bottom of the acoustic panel 200 may be closed by a generally rigid non-perforated plate referred to herein as the backskin 230. A perforated top sheet 220 having perforations 225 may be coupled to the top of the acoustic panel 200. Additional layers may be formed on top of the perforated top sheet 220 for airflow and/or acoustic properties as desired. At least one of the perforated top sheet 220 or the backskin 230 may comprise a composite material. The perforated top sheet 220, core 210, and backskin 230 combine to form cells 212 that become resonator chambers and work to attenuate acoustic waves, such as noise from an aircraft engine, in a known fashion. The perforations 225 are configured to attenuate an engine's noise by directing the sound into the cells 212 of the acoustic panel 200 to allow reflected noise to destructively interfere with and cancel source noise. The acoustic panel 200 may attenuate sound waves at certain frequency ranges depending on the percent open area ("POA") and diameter of the perforations 225, the core height of the cells 212, the volume of the resonator chamber or cell 212, the thickness of the perforated top sheet 220, etc. The POA is the ratio of the surface area of the perforations 225 relative to the surface area of the perforated top sheet 220. In various embodiments, the acoustic panel 200 may comprise one or more septum caps within the cells 212.

Figure 3A:
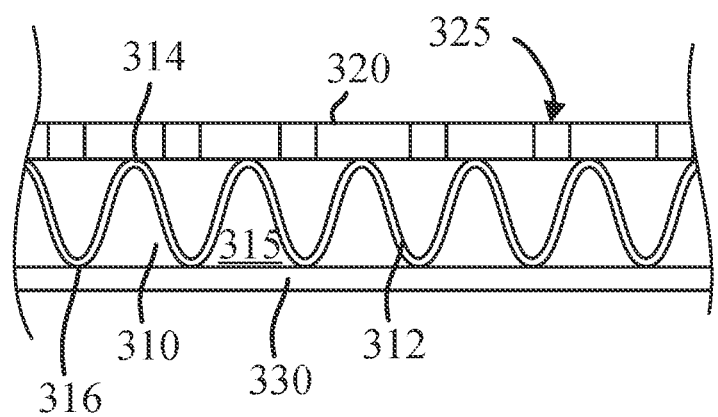
FIG. 3A illustrates a cross-section view of an acoustic panel in accordance with various embodiments.
Figure 3B:
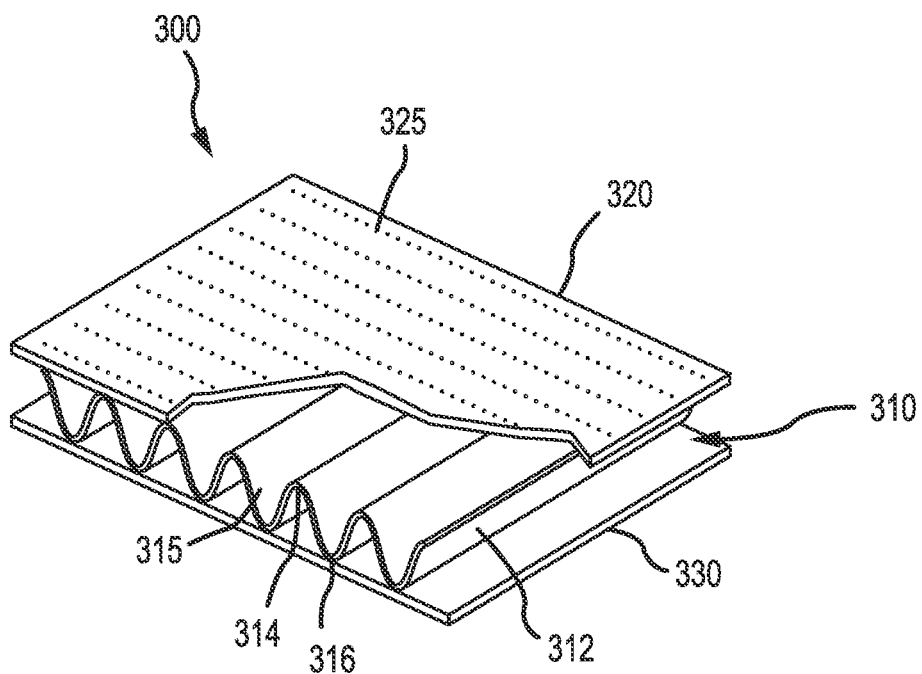
FIG. 3B illustrates a perspective view of an acoustic panel in accordance with various embodiments.

Referring to FIGS. 3A and 3B, a cross-section view (FIG. 3A) and a perspective view (FIG. 3B) of an acoustic panel 300 is illustrated according to various embodiments. The acoustic panel 300 may comprise a perforated top sheet 320 with perforations 325, a core 310, and a backskin 330. In various embodiments, the core 310 comprises a corrugated stiffening member 312. The corrugated stiffening member 312 may comprise a plurality of peaks 314 and troughs 316.

In various embodiments, each trough 316 in the plurality of troughs 316 may interface with and be joined to the backskin 330. Similarly, each peak in the plurality of peaks 314 may interface with and be joined to the top sheet 320. In various embodiments, each peak to trough to peak combination in the plurality of peaks 314 and troughs 316 may define a hollow chamber 315 configured to attenuate an engine's noise. For example, the engine's noise may be directed through the perforations 325 and into the hollow chamber 315 of the acoustic panel 300 to allow reflected noise to destructively interfere with and cancel source noise prior to passing back out through the perforations 325.

Figure 4:
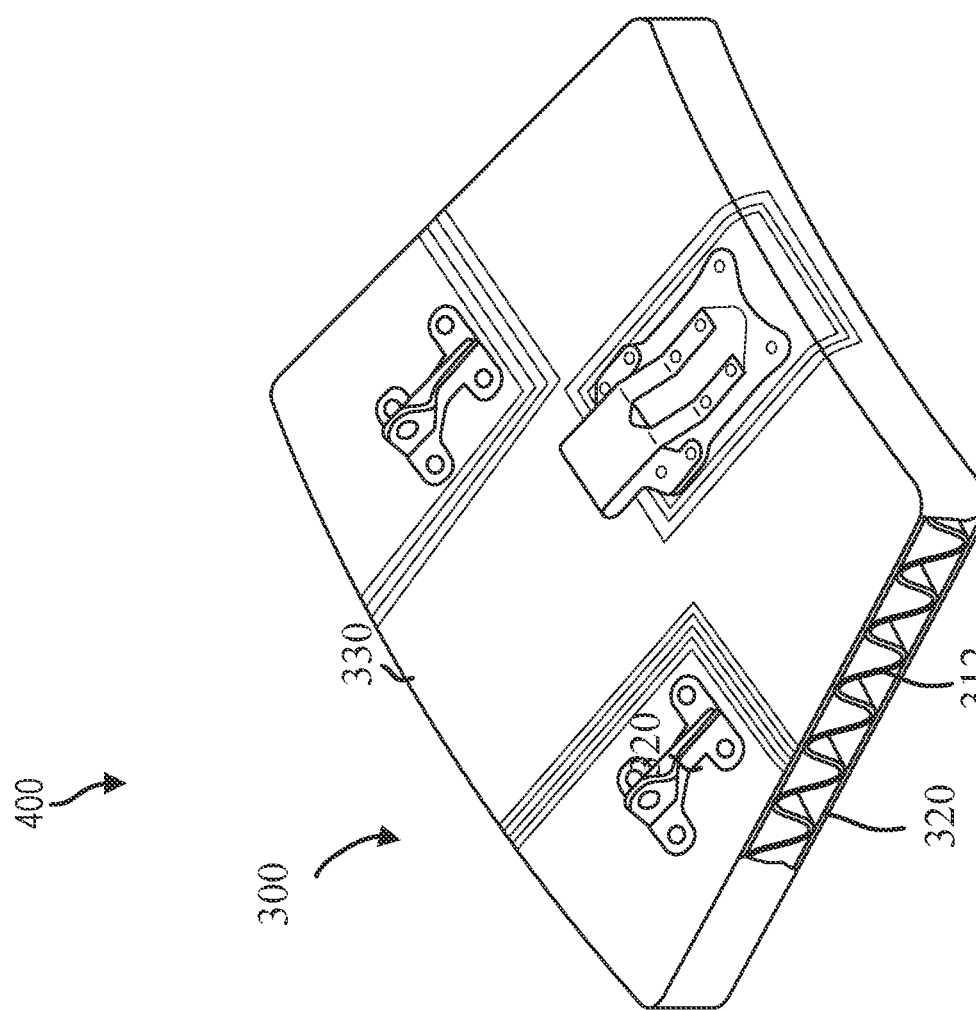
FIG. 4 illustrates a cross-sectional perspective view of a blocker door in accordance with various embodiments.

Referring now to FIG. 4, a cross-sectional perspective view of a blocker door 400 having the acoustic panel 300 in accordance with FIGS. 3A-B is illustrated in accordance with various embodiments. The top sheet 320 may be an inner skin, or a stabilizing skin of the blocker door 400. The top sheet 320 may be spaced apart from the backskin 330 at a constant distance. In contrast, honeycomb core acoustic panels as illustrated in FIG. 2 typically had ramp up and ramp down portions to facilitate closeout necessitated by the honeycomb core configuration. In this regard, for prior art acoustic panels with honeycomb cores 220 from FIG. 2 included flanges. The flanges of prior art acoustic panels had no noise attenuation due to the infeasibility of having a honeycomb core between the small distance between a top sheet and backskin in a flange area of the acoustic panel. In contrast, the manufacturing methods disclosed herein may facilitate a corrugated stiffening member 312 that covers a greater percentage of space between the top sheet 320 and the backskin 330 relative to typical blocker doors with honeycomb cores 220 from FIG. 2. In this regard, an additional 5% to 10% of the blocker door 400 may be capable of noise attenuation as disclosed previously herein. In various embodiments, the corrugated stiffening member 312 is schematically shown in FIG. 4 and would include a shape in accordance with FIGS. 3A-B.

Figure 5:
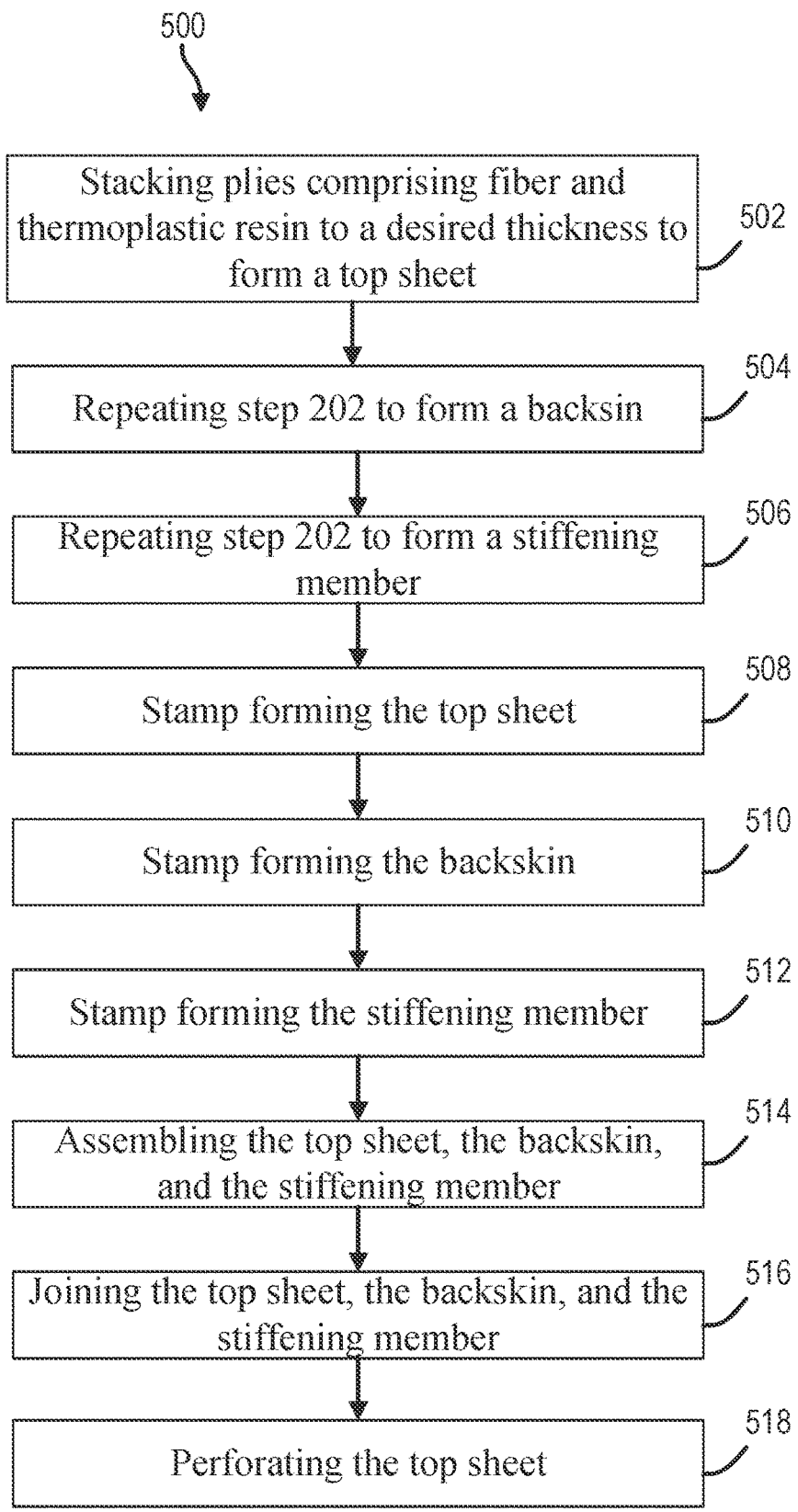
FIG. 5 illustrates a method of manufacturing an acoustic panel in accordance with various embodiments.

With reference to FIG. 5, a method 500 for manufacturing an acoustic panel is provided, in accordance with various embodiments. Method 500 includes stacking plies comprising fiber and thermoplastic resin to a desired thickness to form a top sheet (step 502). Method 500 includes repeating step 502 to form a backskin (step 504) and repeating step 502 to form a stiffening member (step 506). Method 500 includes stamp forming the top sheet (step 508). "Stamp forming" as disclosed herein refers to a variation of compression molding that is similar to a sheet metal forming process. Stamp forming may utilize a compression molding press and a matched pair of molds. A stack of plies of material are heated and positioned between the two halves. Method 500 includes stamp forming the backskin (step 510). Method 500 includes stamp forming the stiffening member (step 512). Method 500 includes assembling the top skin, the backskin, and the stiffening member (step 514). Assembling the top sheet, the backskin, and the stiffening member may occur while the top sheet, the backskin, and the stiffening member are in a heated state. Method 200 includes bonding the top sheet, the backskin, and the stiffening member together to form an acoustic panel (e.g., acoustic panel 300 from FIGS. 3A-B). The method 500 further includes perforating the top sheet (step 518). In various embodiments, the top sheet may be perforated prior to performing the method 500.

Although described herein as comprising stamp forming steps 508, 510, 512 the present disclosure is not limited in this regard. For example, twin sheet forming may be utilized for a top sheet 320, the backskin 330, and/or the corrugated stiffening member 312 from FIGS. 3A-B, in accordance with various embodiments.

Figure 6A:
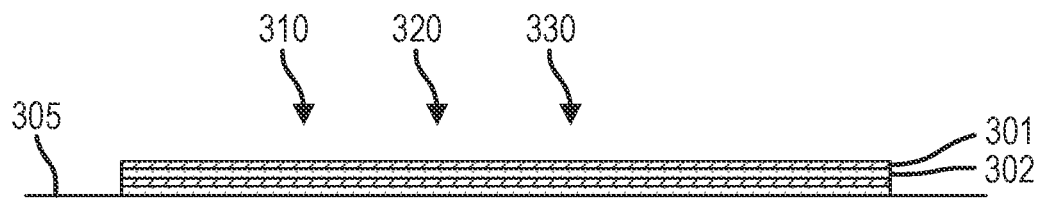
FIG. 6A illustrates forming an acoustic panel in accordance with the method from FIG. 5, in accordance with various embodiments.

With combined reference to FIGS. 5 and 6A, step 502 may include stacking plies of fiber-reinforced thermoplastic sheets 301 and fiber-reinforced thermoplastic sheets 302 to a desired thickness to form a top sheet 320, for instance by alternately placing sheets 301 and 302 in the stack. In various embodiments, and for ease of handling, the sheets may be stacked on a flat surface 305. In various embodiments, sheets 301 comprise fiber sheets pre-impregnated with a thermoplastic resin. However, it is contemplated that various types of fiber and/or thermoplastic resin sheets may be used to form top sheet 320. For example, the sheets may comprise pre-impregnated fibers, separate sheets of fiber and resin, fiber sheets impregnated on demand during the stacking process, among others. The sheets 301, 302 may be tacked together during the stacking process to prevent deconsolidation in response to the top sheet 320 being moved to a stamp forming tool.

With combined reference to FIG. 5 and FIG. 6A, step 504 may include repeating step 202 to form a backskin 330.

With combined reference to FIG. 5 and FIG. 6A, step 504 may include repeating step 202 to form a corrugated stiffening member 312.

Figure 6B:
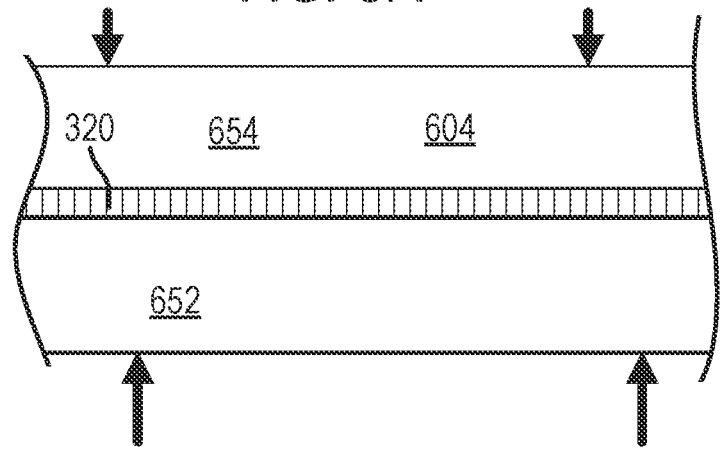
FIG. 6B illustrates forming an acoustic panel in accordance with the method from FIG. 5, in accordance with various embodiments.

With combined reference to FIG. 5 and FIG. 6B, step 508 may include transferring the stack of plies for the top sheet 320 to a stamp forming tool 604 and stamp forming the top sheet 320 via the stamp forming tool 604. The stack of plies for the top sheet 320 may be transferred to stamp forming tool 604 by hand or using an automated process. The stamp forming tool 604 may be configured to heat the top sheet 320 (e.g., via convective heating, conductive heating, inductive heating, etc.) and compressing the stamp forming tool 604. In various embodiments, the top sheet 320 may be heated prior to being transferred to the stamp forming tool 604. The stamp forming tool 604 may comprise a first mold 652 and a second mold 654 corresponding to an inner surface and an outer surface of the top sheet 320. In this regard, the stamp forming may compress the top sheet 320 to form a desired top sheet shape (e.g., a blocker door 400 from FIG. 4), in accordance with various embodiments.

With combined reference to FIG. 5 and FIG. 6B, step 510 may include transferring the stack of plies for the backskin 330 to a stamp forming tool and stamp forming the backskin 330 via the stamp forming tool. Although illustrated as being a flat sheet in FIG. 4, the backskin 330 is not limited in this regard. For example, the backskin 330 may comprise an arcuate shape, or the like, in accordance with various embodiments. The backskin 330 may be stamp formed in accordance with the top sheet 320 as outlined previously herein. The stamp forming tool may include a complimentary shape to the backskin 330.

With combined reference to FIG. 5 and FIG. 6B, step 512 may include transferring the stack of plies for the corrugated stiffening member 312 to a stamp forming tool and stamp forming the stack of plies to define the corrugated stiffening member 312 via the stamp forming tool. The corrugated stiffening member 312 may be stamp formed in accordance with the top sheet 320 as outlined previously herein. The stamp forming tool for the stiffening member 312 may include a complimentary shape to the corrugated stiffening member 312 shown in FIGS. 3A and 3B.

Figure 6C:
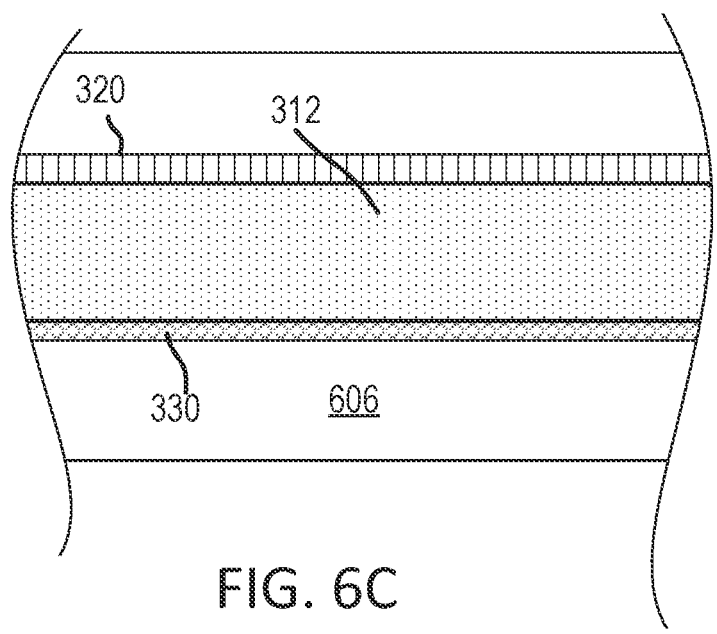
FIG. 6C illustrates forming an acoustic panel in accordance with the method from FIG. 5, in accordance with various embodiments.

With combined reference to FIG. 5 and FIG. 6C, step 514 may include assembling the top sheet 320, the backskin 330 and the corrugated stiffening member 312 as shown within a consolidation tool 606. In various embodiments, the corrugated stiffening member 312 is only schematically shown in FIG. 6C. In this regard, the corrugated stiffening member 312 may be disposed between the top sheet 320 and the backskin 332. The top sheet 320, the backskin 330, and the corrugated stiffening member 312 may remain in a heated state from the stamp forming steps 508, 510, 512. In various embodiments, assembly of the top sheet 320, the backskin 330, and the corrugated stiffening member 312 may include tacking together peaks of the corrugated stiffening member 312 to the top sheet 320 and tacking together troughs of the corrugated stiffening member 312 to the backskin 330 to prevent/reduce the potential of deconsolidation as disclosed previously herein. Although described herein as including the troughs coupled to the backskin 330 and the peaks coupled to the top sheet, the present disclosure is not limited in this regard. For example, peaks and troughs are dependent on orientation and are not meant to be limiting with respect to orientation with regards to this disclosure.

With combined reference to FIG. 5 and FIG. 6C, step 516 may include bonding the top sheet 320, the backskin 330, and the corrugated stiffening member 312 to form an acoustic panel (e.g., acoustic panel 300 from FIG. 3). In this regard, the top sheet 320, the backskin 332, and the corrugated stiffening member 312 may consolidate via cooling, in accordance with various embodiments. In various embodiments, cooling may be passive or active. The method 500 may further comprise removing the resultant stiffened structure from the consolidation tool 606.

Figure 7:
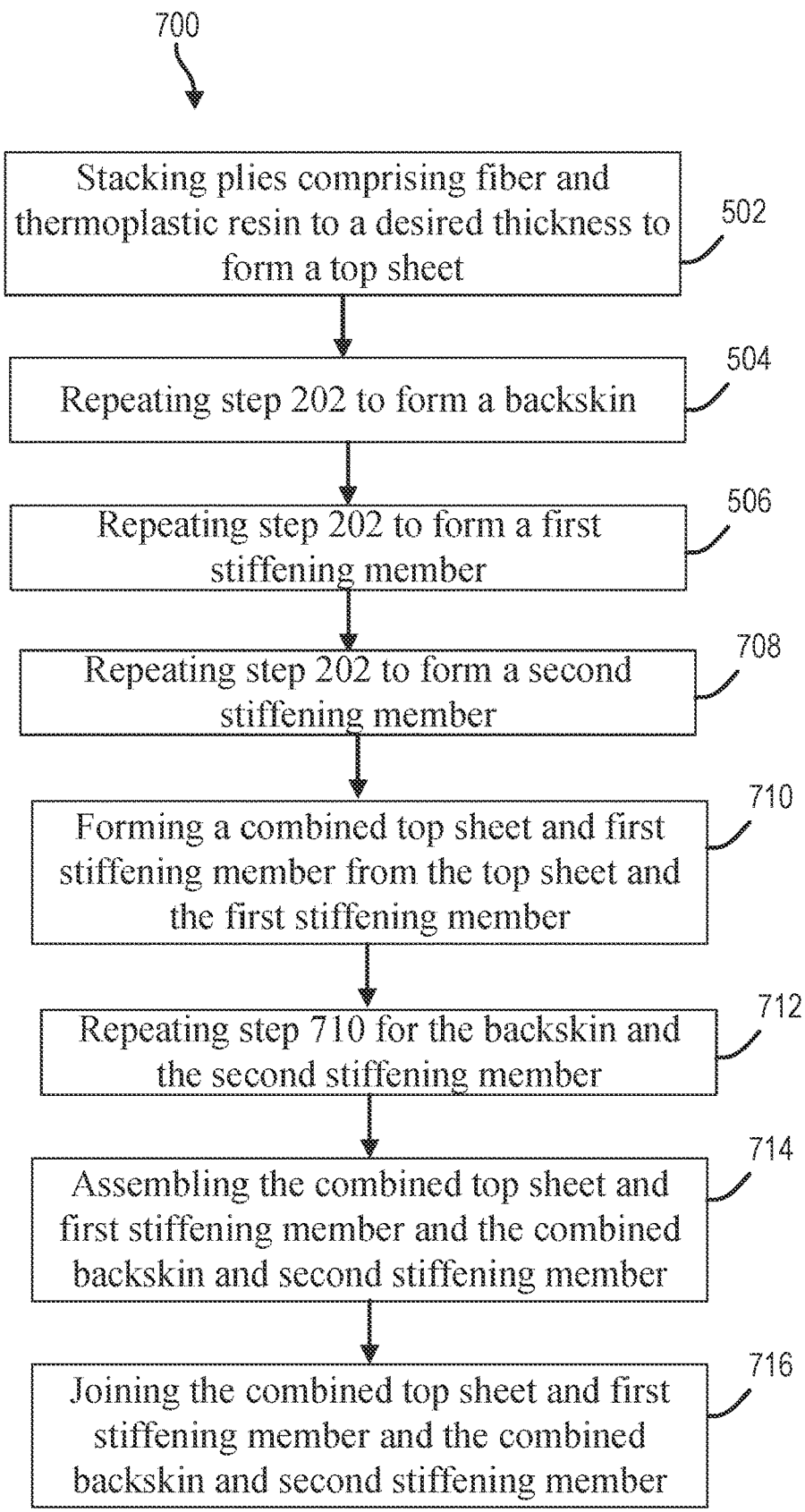
FIG. 7 illustrates forming an acoustic panel in accordance with the method from FIG. 5, in accordance with various embodiments.

Referring now to FIG. 7, a method 700 of forming an acoustic panel 300 from FIGS. 3A-B is illustrated, in accordance with various embodiments. Steps 502, 504, and 506 of method 500 may be repeated. The method 700 may further comprise repeating step 502 to form a second stiffening member (step 708). The second stiffening member may have a similar contour to a first stiffening member of step 506. The method 700 further includes forming a combined top sheet and first stiffening member from the top sheet and the first stiffening member (step 710). The combined top sheet and the first stiffening member may be formed via twin sheet forming or stamp forming, in accordance with various embodiments. The method 700 further includes repeating step 710 for the backskin and the second stiffening member (step 712). The method 700 further includes assembling the combined top sheet and first stiffening member and the combined backskin and second stiffening member (step 714). The method further includes bonding the combined top sheet and first stiffening member and the combined backskin and second stiffening member (step 716). In various embodiments, the first stiffening member and the second stiffening member may be bonded together to form the corrugated stiffening member 312 from FIGS. 3A-B, which may provide a long length to bond the reinforced thermoplastic sheets in accordance with various embodiments.

Although described herein with reference to a blocker door in an aircraft nacelle, the present disclosure may be utilized in any environment in which noise attenuation is desired.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A method for forming a fiber-reinforced thermoplastic acoustic panel, comprising:
    forming a plurality of plies of thermoplastic composite sheets to a first thickness to form a top sheet;
    perforating the top sheet;
    forming a plurality of plies of thermoplastic composite sheets to a second thickness to form a backskin;
    forming a plurality of plies of thermoplastic composite sheets to a third thickness to form a stiffening member;
    forming the top sheet in a first contour;
    forming the backskin in a second contour, the second contour being different from the first contour;
    forming the stiffening member comprising a shape having a plurality of peaks and troughs, the stiffening member including a cross-sectional shape defining a continuous sinusoidal wave;
    tacking together one of the peaks and the troughs of the stiffening member on the top sheet;
    tacking together the other of the peaks and the troughs of the stiffening member to the backskin;

assembling the top sheet, the backskin, and the stiffening member within a consolidation tool, wherein the top sheet, the backskin, and the stiffening member remain in a heated state; and consolidating, via cooling, the stiffening member to the top sheet and the backskin to form the fiber-reinforced thermoplastic acoustic panel, wherein each of the plurality of peaks and troughs defines a hollow chamber configured to attenuate noise.

2. The method of claim 1, wherein forming the top sheet, forming the backskin, and forming the stiffening member are each performed via stamp forming.

3. The method of claim 1, wherein forming the top sheet, forming the backskin, and forming the stiffening member are each performed via twin sheet forming.

4. The method of claim 1, wherein forming the top sheet, forming the backskin, and forming the stiffening member are each performed via automated fiber placement.

5. The method of claim 1, wherein the plurality of peaks are joined to and mate with the top sheet, and wherein the troughs are joined to and mate with the backskin.

6. The method of claim 1, wherein joining the stiffening member to the top sheet and the backskin form the fiber-reinforced thermoplastic acoustic panel.

7. The method of claim 6, wherein the stiffening member is disposed between the backskin and the top sheet.

8. An acoustic panel for a nacelle comprising:
a non-perforated backskin;
a perforated top sheet; and
a core located between the non-perforated backskin and the perforated top sheet, the core including a corrugated stiffener, the core including alternating peaks and troughs, the core including a cross-sectional shape defining a continuous sinusoidal wave, wherein each of a peak to trough to peak combination of the alternating peaks and troughs at least partially defines a hollow chamber configured to attenuate noise.

9. The acoustic panel of claim 8, wherein the peaks mate with and are coupled to the perforated top sheet, and wherein the troughs mate with and are coupled to the non-perforated backskin.

10. The acoustic panel of claim 8, wherein the perforated top sheet includes a plurality of perforations.

11. The acoustic panel of claim 10, wherein a set of the plurality of perforations are in fluid communication with the hollow chamber.

12. The acoustic panel of claim 8, wherein the plurality of peaks are joined to and mate with the perforated top sheet, and wherein the troughs are joined to and mate with the non-perforated backskin.

13. The nacelle comprising the acoustic panel of claim 8.

14. A blocker door for a nacelle, the blocker door comprising:
a backskin;
a top sheet; and
a core located between the backskin and the top sheet, the core comprising a corrugated stiffener, wherein the corrugated stiffener includes a cross-sectional shape defining a continuous sinusoidal wave.

15. The blocker door of claim 14, wherein the corrugated stiffener includes alternating peaks and troughs.

16. The blocker door of claim 15, wherein the peaks mate with and are coupled to the top sheet, and wherein the troughs mate with and are coupled to the backskin.

17. The blocker door of claim 15, wherein the top sheet includes a plurality of perforations.

18. The blocker door of claim 17, wherein a set of the plurality of perforations are in fluid communication with a hollow chamber at least partially defined by a portion of the corrugated stiffener extending from a first peak to a trough to a second peak.

19. The nacelle comprising the blocker door of claim 14.

20. The blocker door of claim 14, wherein:
the core includes alternating peaks and troughs; and
each of a peak to trough to peak combination of the alternating peaks and troughs at least partially defines a hollow chamber configured to attenuate noise.

* * * * *